UNITED STATES PATENT OFFICE.

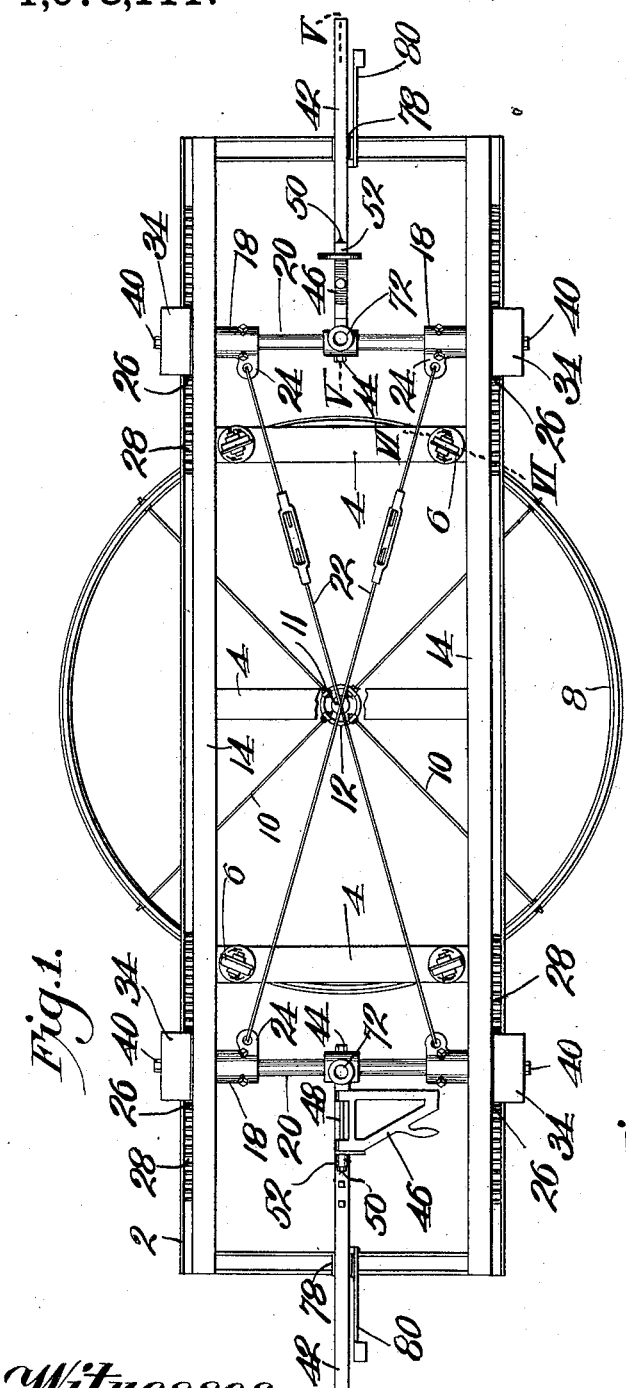

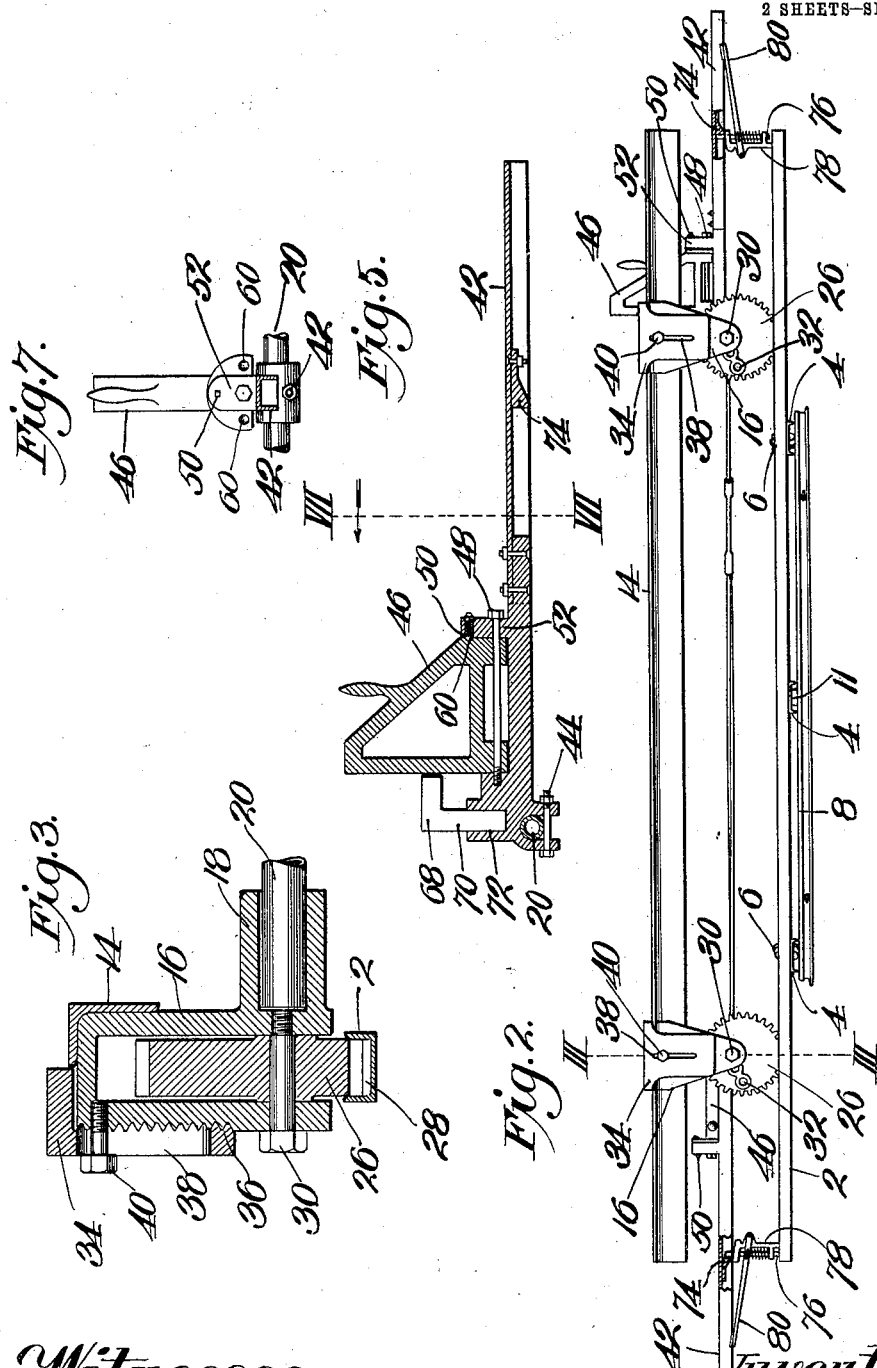

McELMER STEWART, OF KANSAS CITY, MISSOURI.

VEHICLE-JACK.

1,078,111.  Specification of Letters Patent.  Patented Nov. 11, 1913.

Application filed June 21, 1913. Serial No. 775,063.

*To all whom it may concern:*

Be it known that I, McElmer Stewart, a citizen of the United States, residing at Kansas City, in the county of Jackson and State of Missouri, have invented certain new and useful Improvements in Vehicle-Jacks, of which the following is a specification.

This invention relates to vehicle jacks, and one object of the same is to produce an apparatus of this character in which the vehicle, such as an automobile, will, on riding onto the jack frame, automatically operate the jack to engage the vehicle frame and lift the same so as to remove the weight of the vehicle from the wheels.

Another object in view is to provide an apparatus which will be simple in operation and adjustable in its parts, and upon which the vehicle may be run from either direction.

With these objects in view, my invention comprises certain novel and peculiar features of construction and combination of parts, all as will hereinafter be described and claimed; and in order to afford a full and complete understanding thereof, reference will be made to the accompanying drawings forming a part of this specification, and in which:—

Figure 1, is a plan view of the apparatus; Fig. 2, is a side view of the same in raised position. Fig. 3, is an enlarged vertical section along the line III—III of Fig. 2; but showing the relation of the parts when the jack is in lowered position. Fig. 4, is a side elevation of the parts shown in Fig. 3. Fig. 5, is a section along the line V—V of Fig. 1; and Figs. 6 and 7 are sections along the lines VI—VI and VII—VII respectively of Fig. 1 and Fig. 5.

Referring to the said drawings, the base supporting frame of the jack comprises a pair of track bars 2 formed of channel iron and suitably joined together by cross channels 4 provided with rollers 6. These rollers are designed to support the frame upon a circular track 8 which is anchored in the ground or floor of a garage, and provided with suitable brace rods 10 connecting the track with a central block 12, upon which is also pivoted at 11 the middle cross channel 4 of the supporting frame. This track construction adapts the jack for receiving the vehicle and allowing the same to be run off the jack in any desired direction.

The jack frame proper is a longitudinally rolling frame adapted to be automatically operated by the vehicle riding thereover, and comprises a pair of side bars 14 of angle iron, which are joined together near their opposite ends by yokes 16, the inner faces of which are provided with hubs 18 for journaling shafts 20 connecting the pairs of yokes at each end of the jack frame. The yokes are held toward each other so as to engage said shafts by means of a pair of turnbuckle rods 22 extending diagonally of the jack frame and secured to lugs 24 formed upon said hubs. Within the yokes are mounted gears 26 which are adapted to operatively engage with racks 28 provided in the underlying portions of the tracks 2. These gears 26 are rotatably mounted within the yokes by means of pins 30 carried by the yokes, each pin passing through one of a series of openings 32 in the gears provided for said pins. These openings 32 are arranged at different distances from the center of the gear in order to provide for varying degrees of eccentric movement of the gear to adapt the same to the different degrees of lift required of the jack. For example, in the case of motor cars having one axle higher than the other, one of the pairs of gears will be adjusted by the means of said openings to exert a greater lift than the other pair of said gears. An adjustable bracket 34 is also carried by each yoke 16 in order that the jack shall be adapted for vehicles of different heights of axles. These brackets have vertical toothed arms to engage correspondingly toothed portions on the yokes, the adjustment being accomplished by means of a slot 38 and bolt 40 provided in connection with each bracket.

For carrying the parts which are to engage the front axle of the vehicle, each shaft 20 is provided with a pivoted arm 42 having a bifurcated portion at one end which is held in engagement with the shaft by a bolt 44. Each of these arms 42 has mounted thereon an axle engaging bracket 46 which is pivoted by means of a bolt 48 so that the bracket may be supported in vertical position for engaging the axle of the vehicle or in horizontal position in case it is desired to run the vehicle on to the jack in the opposite direction. The bracket may be held in either of said positions by means of a spring-pressed plunger 50 mounted in a lug 52 which carries one end of the bolt 48, said plunger being adapted to engage in suitable recesses 60 provided in the adjacent end of the bracket. This arm 42 is further provided with an angle block 68 having its vertical arm 70 adapted to be seated in a socket 72 formed in the pivoted end of the arm 42. This block is for the purpose of engaging and supporting the front axle of the vehicle at its mid-point, as in the case of motor cars in which the space adjacent the wheels is too limited to allow the use of the brackets 34 for supporting the ends of the axle.

It will now be understood that as the vehicle moves on to the jack, its front axle engages one of the brackets and moves the same forward, or toward the end of the jack frame, thereby drawing the jack frame forward upon the gears 26. Since these gears are all mounted eccentrically, their axes are, as a consequence, moved upward, which results in elevating the jack frame so that the brackets 34, or at any rate the rear brackets 34 and the front block 68—if the latter is in use—are moved into engagement with the axles of the vehicle, thereby lifting the vehicle with its wheels suspended from the ground. As the frame advances, the arms 42 are also advanced and the latter are provided with lugs 74 which engage with sliding latches 76 mounted in posts 78 at the ends of the apparatus.

The rear arm 42 moves so as to bring its lug 74 up against the rear of the rear latch 76, while the lug 74 on the forward arm moves over the forward latch and drops in front of the same. With the lugs so engaged, the arms are held against casual disengagement and consequent lowering of the jack in either direction. When the jack is to be lowered, this may be accomplished by depressing a lever 80 at either end of the jack to lower the corresponding latch, whereupon the jack may be lowered by a movement of the frame in the direction of that end of the jack, it being understood, of course, that if this should be in the same direction as that in which the vehicle moved on the frame, the bracket 46 which was engaged by the vehicle must be moved out of vertical position to allow the vehicle to pass off the jack.

From the foregoing it will be apparent that I have provided a simple and efficient apparatus for carrying out the objects of my invention, and while the preferred form of the same has been illustrated and described, I desire to be understood as reserving the right to all changes and modifications falling within the spirit and scope of the appended claims.

I claim—

1. In a vehicle jack, a track mounted to turn about a vertical axis, a vehicle supporting frame carried by said track, and means adapted to be operated by a vehicle moving over said frame for imparting vertical movement to said frame to jack said vehicle.

2. In a vehicle jack, a track, a vehicle supporting frame above said track and provided with rotary elements eccentrically mounted thereon and adapted to travel on said track, and means adapted to be engaged by a vehicle moving over said frame to move the frame and rotate said elements, whereby said frame will be lifted to jack the vehicle.

3. In a vehicle jack, a track provided with a set of racks, a vehicle supporting frame above said track and provided with a set of gears eccentrically mounted thereon and adapted to travel on said track and engage said racks, and means adapted to be engaged by a vehicle moving over said frame to move the frame and rotate said elements, whereby said frame will be lifted to jack the vehicle.

4. In a vehicle jack, a track provided with a locking mechanism, a vehicle supporting frame above said track and provided with a set of rotary elements eccentrically mounted thereon and adapted to travel on said track, and means adapted to be engaged by a vehicle moving over said frame to move the frame and rotate said elements whereby the frame will be lifted to jack the vehicle, said means being provided with a catch for engaging said locking mechanism for locking the jack in raised position.

5. In a vehicle jack, a track, a vehicle supporting frame above said track, means interposed between said track and frame for lifting the frame upon longitudinal movement thereof, and vertically adjustable elements mounted on said frame for engagement with the axles of the vehicle.

6. In a vehicle jack, a track, a vehicle supporting frame above said track, means interposed between said track and frame for lifting the frame upon longitudinal movement thereof, and a bracket carried within the frame and movable into vertical position for engagement by the vehicle when moving thereover to impart longitudinal movement to the frame or into horizontal inoperative position.

7. In a vehicle jack, a track, a vehicle supporting frame above said track, means interposed between said track and frame for lifting the frame upon longitudinal movement thereof, a bracket pivoted on said frame and movable into operative position for engagement by a vehicle axle when moving thereon to impart longitudinal movement to the frame or into inoperative position, and means connected with said bracket for engagement with a fixed part of the jack for locking said frame in lifted position.

8. In a vehicle jack, a track, a vehicle supporting frame above said track, means interposed between said track and frame for lifting the frame upon longitudinal movement of the frame, means carried by said frame for engaging one of the axles of the vehicle near its ends, means also carried by said frame for engaging the mid-point of the other axle of the vehicle, and means for locking said frame in lifted position.

9. In a vehicle jack, a vehicle supporting frame, a device carried by said frame in position to be engaged by a vehicle in passing over the frame, and means actuated by the movement of the vehicle after engagement with said device for imparting vertical movement to said frame to jack the vehicle.

10. In a vehicle jack, a track, a vehicle supporting frame above said track and provided with rotary elements eccentrically mounted thereon and adapted to travel on said track, means permitting the adjustment of said rollers on said frame to vary their eccentric movement, and means adapted to be engaged by a vehicle moving over said frame to move the frame and rotate said elements whereby said frame will be lifted to jack the vehicle.

In testimony whereof, I affix my signature, in the presence of two witnesses.

McELMER STEWART.

Witnesses:
 CHAS. W. GERARD,
 G. Y. THORPE.

---

Copies of this patent may be obtained for five cents each, by addressing the "Commissioner of Patents, Washington, D. C."